United States Patent
Miller et al.

(10) Patent No.: US 12,453,338 B2
(45) Date of Patent: Oct. 28, 2025

(54) HONEYBEE SWARM TRAP

(71) Applicants: David Miller, Anderson, SC (US);
Luke A Miller, Murfreesboro, TN (US)

(72) Inventors: David Miller, Anderson, SC (US);
Luke A Miller, Murfreesboro, TN (US)

( * ) Notice: Subject to any disclaimer, the term of this patent is extended or adjusted under 35 U.S.C. 154(b) by 0 days.

(21) Appl. No.: 17/751,192

(22) Filed: May 23, 2022

(65) Prior Publication Data

US 2022/0369603 A1    Nov. 24, 2022

Related U.S. Application Data (60) Provisional application No. 63/192,493, filed on May 24, 2021.

(51) Int. Cl.
| | | |
|---|---|---|
| *A01K 47/06* | (2006.01) | |
| *A01K 49/00* | (2006.01) | |
| *A01K 53/00* | (2006.01) | |
| *A01K 57/00* | (2006.01) | |
| *A01M 23/18* | (2006.01) | |

(52) U.S. Cl.
CPC .............. *A01K 47/06* (2013.01); *A01K 53/00* (2013.01); *A01K 57/00* (2013.01); *A01M 23/18* (2013.01)

(58) Field of Classification Search
CPC ........ A01K 47/00; A01K 47/06; A01K 53/00; A01K 57/00
USPC .......................... 449/9–11, 13, 27, 29, 30, 48
See application file for complete search history.

(56) References Cited

U.S. PATENT DOCUMENTS

| | | | |
|---|---|---|---|
| 30,255 A | 10/1860 | Shaffer | |
| 35,031 A * | 4/1862 | Marshall | A01K 47/00 449/36 |
| 195,870 A * | 10/1877 | Wright | A01K 47/00 449/27 |
| 205,339 A * | 6/1878 | Barnes | A01K 47/06 223/109 R |
| 424,844 A * | 4/1890 | Baird | A01K 47/06 449/20 |
| 593,712 A | 11/1897 | Williams | |
| 852,907 A | 5/1907 | Saffell | |
| 945,407 A | 1/1910 | Nichols | |

(Continued)

FOREIGN PATENT DOCUMENTS

| | | | |
|---|---|---|---|
| CN | 213127622 U | * | 5/2021 |
| DE | 4037820 A1 | * | 11/1990 |

(Continued)

OTHER PUBLICATIONS

English-language translation of DE 202015106406 U1 (Year: 2017).*

(Continued)

*Primary Examiner* — Son T Nguyen
(74) *Attorney, Agent, or Firm* — Suiter Swantz IP (57) ABSTRACT

A Honeybee Swarm Trap to provide an inexpensive but sturdy bee box for keeping bees that is flexible in its application. To propagate beehives a beekeeper commonly uses a swarm catcher. These swarm catchers are placed near existing beehives, typically those naturally occurring, a swarm trap may be placed near the location of original beehive. Scout bees can visit the swarm trap and assess the trap for a swarm or propagated swarm to take up residence. Once the honeybee swarm take up residence in the swarm trap, the beekeeper can move the swarm to another location to house the honeybee colony.

8 Claims, 14 Drawing Sheets

(56) References Cited

U.S. PATENT DOCUMENTS

| | | | | |
|---|---|---|---|---|
| 945,642 | A | * | 1/1910 | Toth ........................ A01K 47/00 449/27 |
| 1,116,923 | A | * | 11/1914 | Rahn ........................ A01K 47/06 449/10 |
| 1,371,318 | A | | 3/1921 | McMongal |
| 1,950,321 | A | * | 3/1934 | Neil ........................ A01K 47/00 449/45 |
| 2,001,845 | A | * | 5/1935 | Ivar ........................ A01K 47/06 449/21 |
| 2,276,768 | A | * | 3/1942 | Flanagan ............... A01K 55/00 292/258 |
| 2,578,634 | A | | 12/1951 | Pease |
| 2,580,282 | A | * | 12/1951 | Colley ................... A01K 47/02 428/595 |
| 2,602,940 | A | | 7/1952 | Winklbauer |
| 2,644,175 | A | | 7/1953 | Pease |
| 2,829,384 | A | | 4/1958 | Studler |
| 3,110,044 | A | * | 11/1963 | Dullas ..................... A01K 47/00 449/30 |
| 3,704,471 | A | * | 12/1972 | Bielby .................... A01K 47/06 449/13 |
| 4,483,031 | A | * | 11/1984 | Shaparew ............... A01K 47/06 449/14 |
| 4,524,476 | A | * | 6/1985 | Adams, IV ............ A01K 55/00 449/27 |
| 4,817,330 | A | | 4/1989 | Fahringer |
| 5,211,597 | A | * | 5/1993 | Scott ....................... A01K 47/00 449/37 |
| 5,509,846 | A | * | 4/1996 | Kueneman ............. A01K 47/06 449/25 |
| 7,309,274 | B2 | | 12/2007 | Teal et al. |
| 8,066,988 | B1 | | 11/2011 | Teal et al. |
| 11,160,258 | B1 | * | 11/2021 | Chiles .................... A01K 47/06 |
| 2005/0120963 | A1 | * | 6/2005 | Vadis ..................... A01K 63/003 119/6.5 |
| 2006/0141904 | A1 | | 6/2006 | Teal et al. |
| 2012/0295514 | A1 | * | 11/2012 | Keppens ................ A01K 47/06 449/13 |
| 2014/0335760 | A1 | * | 11/2014 | Huvermann ........... A01K 47/00 449/30 |
| 2017/0354127 | A1 | * | 12/2017 | Woods .................... A01K 53/00 |
| 2020/0205383 | A1 | * | 7/2020 | Linder .................... A01K 49/00 |

FOREIGN PATENT DOCUMENTS

| | | | | |
|---|---|---|---|---|
| DE | 10118667 | A1 | * | 10/2002 ............. A01K 57/00 |
| DE | 202015106406 | U1 | * | 4/2017 |
| GB | 2445861 | A | | 7/2008 |
| JP | 2018027067 | A | * | 2/2018 |
| KR | 200385239 | Y1 | * | 5/2005 |
| KR | 100969198 | B1 | * | 7/2010 |
| KR | 20110015488 | A | * | 2/2011 ............. A01K 47/06 |
| KR | 101348172 | B1 | * | 10/2012 |
| WO | WO2006071902 | A2 | | 7/2006 |
| WO | WO2006071902 | A3 | | 7/2006 |
| WO | WO-2015156694 | A2 | * | 10/2015 ............. A01K 47/00 |

OTHER PUBLICATIONS

English-language translation of DE 4037820 A1 (Year: 1992).*
English-language translation of KR 100969198 B1 (Year: 2010).*
CN 213127622 U machine translation (Year: 2021).*
"Layens Swarm Trap Kit—Heavy Duty" (available at https://horizontalhive.com/buy-hive-bees/swarm-trap-top-bar-sale.shtml#layens-swarm-trap, last visited May 25, 2022).
"Heavy-Duty Swarm Trap—6 Layens Frames" (available at https://horizontalhive.com/buy-hive-bees/swarm-trap-top-bar-sale.shtml#/layens-swarm-trap, last visited May 25, 2022).
"How to build a Honeybee Swarm Trap | beekeeping" (available at https://www.youtube.com/watch?v=wXoi_dUhTtY, last visited May 25, 2022).
"Swarm Trapping 101: Swarm Trap Design and Placement" (available at https://www.youtube.com/watch?v=H1e-5v0GP91, last visited May 25, 2022).
"Build a swarm trap for catching wild honey bees! HNBEES #2" (availabe at https://www.youtube.com/watch?v=4Di21MOQe_E, last visited May 25, 2022).
"What Is A Swarm Trap? (How to Get "FREE" Bees!)" (available at , https://www.beekeepingfornewbies.com/what-is-a-swarm-trap/, last visited May 25, 2022).
"Honey Bee Swarm Trap with Frames and Swarm Lure By East Coast Bees" (available at https://www.amazon.com/Honey-Swarm-East-Coast-Bees/dp/B07ZRVTMCS?ref_=ast_sto_dp, last visited May 25, 2022).
"Swarm Trooper Honey Bee Swarm Catcher" (available at https://meyerbees.com/product/swarm-trooper-honey-bee-swarm-catcher/, May 25, 2022).

* cited by examiner

HONEYBEE SWARM TRAP

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the honeybee Swarm Trap is bee keeping. More specifically the general field of the embodiments of the Swarm Trap is a bee trap to collect swarms of bees from existing beehives, typically naturally occurring beehives.

SUMMARY OF THE EMBODIMENTS

The objective of the embodiments of the Swarm Catcher Bee Trap is to provide an inexpensive but sturdy beehive cavity for swarming bees that is light weight, portable and 40 to 60 liters internal volume, in its application. To propagate beehives a beekeeper may use a swarm trap. These swarm traps are placed within two miles of existing beehives, or wherever naturally occurring beehives may exist. A swarm trap may be placed near the location of original beehive but not usually closer than 100 yards. Scout bees can visit the swarm trap and assess the trap for a swarm or propagated swam to take up residence. Once the bee swarm takes up residence in the swarm trap, the beekeeper can move the swarm to another location to house in a more permanent beehive.

There has thus been outlined, rather broadly, the more important features of the embodiments in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for description and should not be regarded as limiting. As such, those skilled in the art will appreciate that the conception, upon which this disclosure is based, may readily be used as a basis for the designing of other structures, methods, and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1:
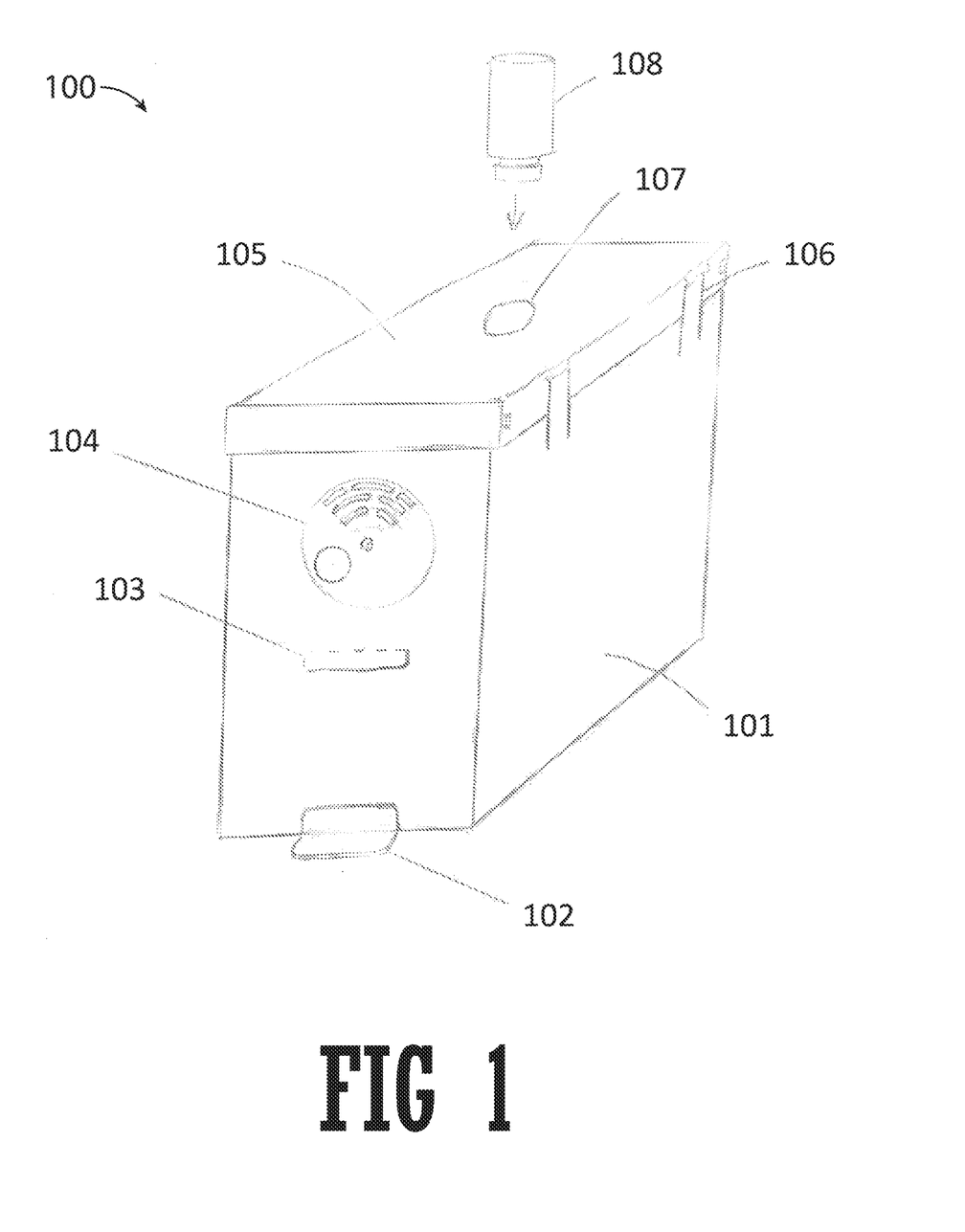
FIG. 1 is a perspective view of the front of an embodiment of the Honeybee Swarm Trap.

Embodiments of the Swarm Catcher Honeybee Trap (hereinafter "Honeybee Trap") 100 comprises a honeybee trap box 101; a lower hinged door 102; an upper hinged door 103; a vent disc 104; a semi-punched kidney shaped front hole 205; a semi-punched kidney shaped back hole 601; an outer lid with integral hinge 105; one or more integral locking tab 106; a removable semi punched hole 107 for a feeder jar; an optional feeder jar 108; a pre-punched or pre-installed threaded receiving means 510 for the feeder jar.

Figure 12A:
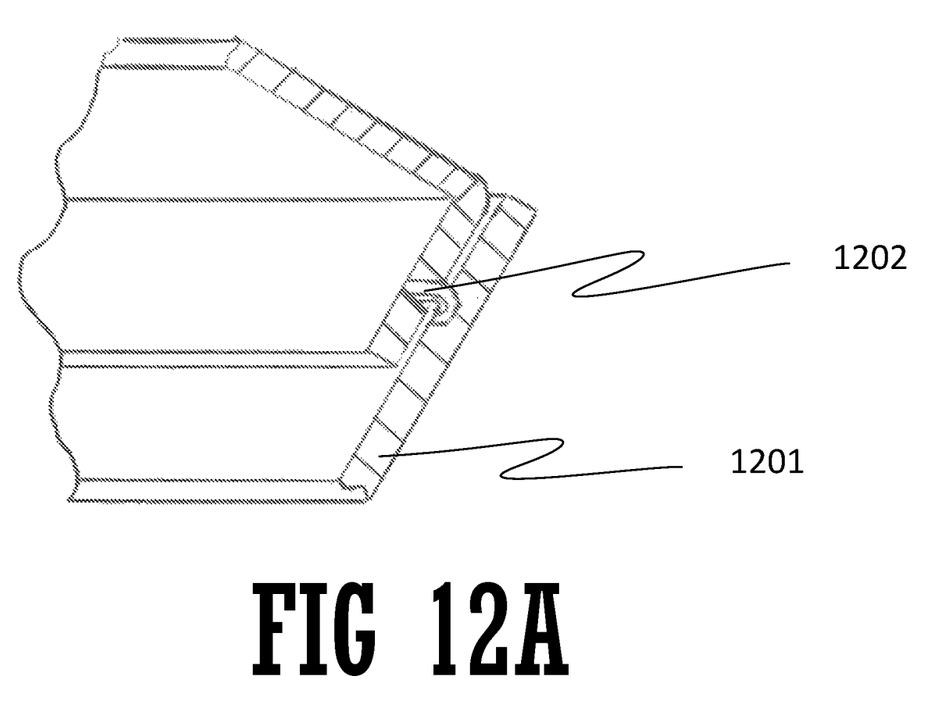
FIG. 12A is a view of an embodiment of the corrugated or polymeric material or other weather resistant material 1201 held in place with a flat wire clip 1202.
Figure 12B:
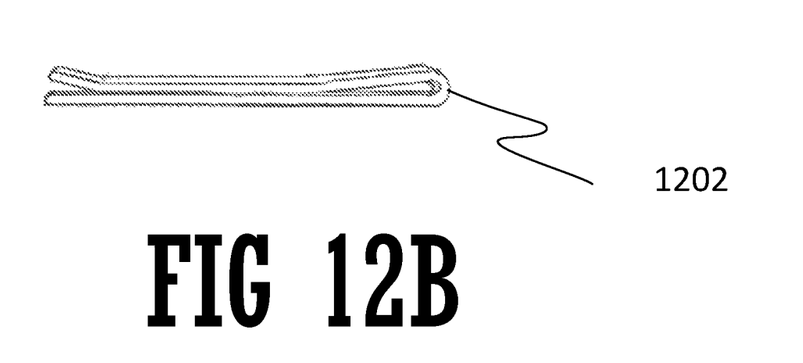
FIG. 12B shows an embodiment of a flat wire clip 1202.

In an embodiment of the Honeybee Trap 100, the honeybee trap box 101 is manufactured from corrugated or polymeric material or other weather resistant material. The honeybee trap box 101 may be colored gray, green or other color so as painting is not required. The corrugated or polymeric material or other weather resistant material 1201 when assembled, the corners are held in place with one or more of screws and buttons and a flat wire clip 1202 or may be sonic welded.

Figure 13A:
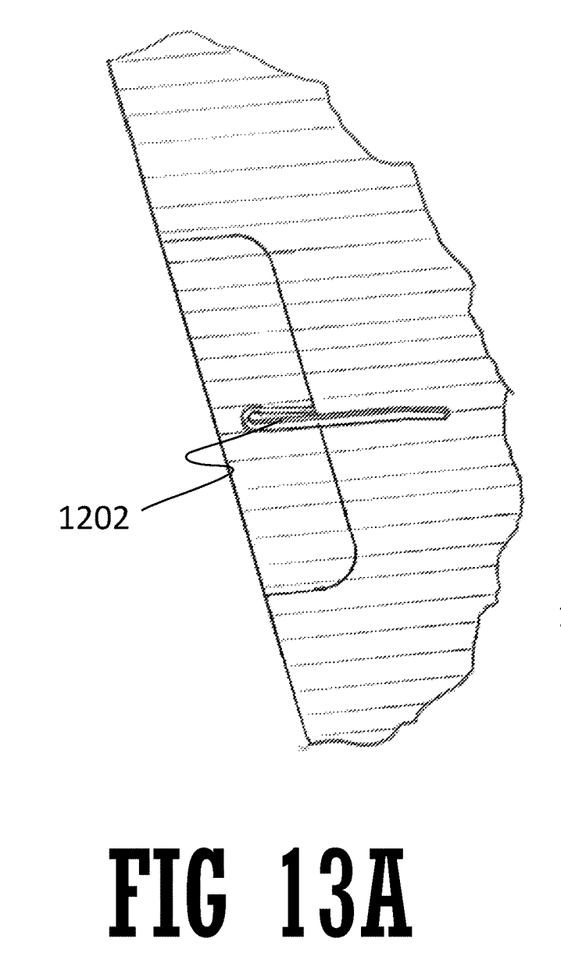
FIG. 13A is a view of an embodiment of either a lower hinged door 102 or an upper hinged door 103 held closed with a flat wire clip 1202.
Figure 13B:
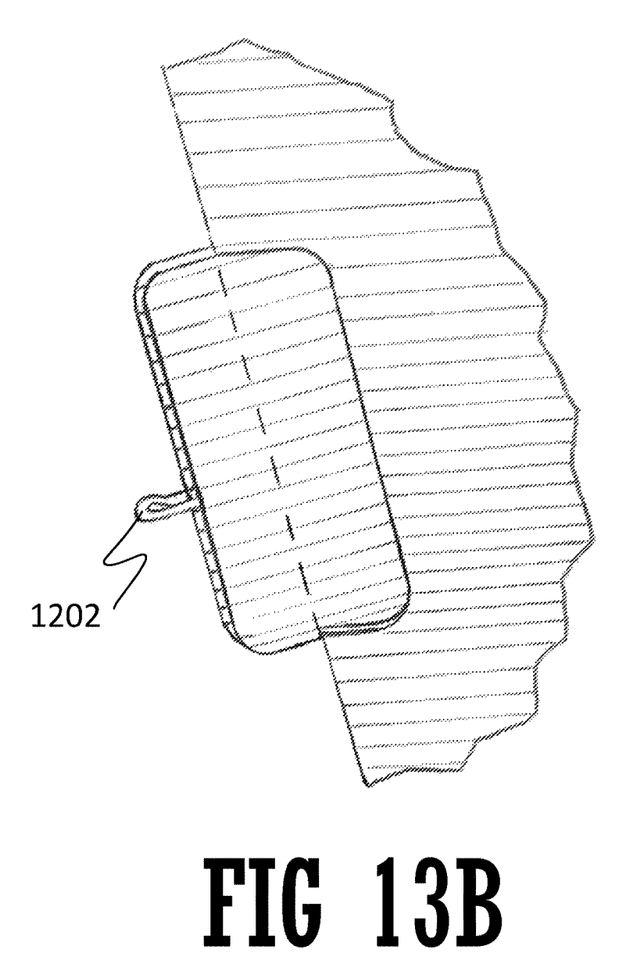
FIG. 13B is a view of an embodiment of either a lower hinged door 102 or an upper hinged door 103 held open with a flat wire clip 1202.
Figure 14A:
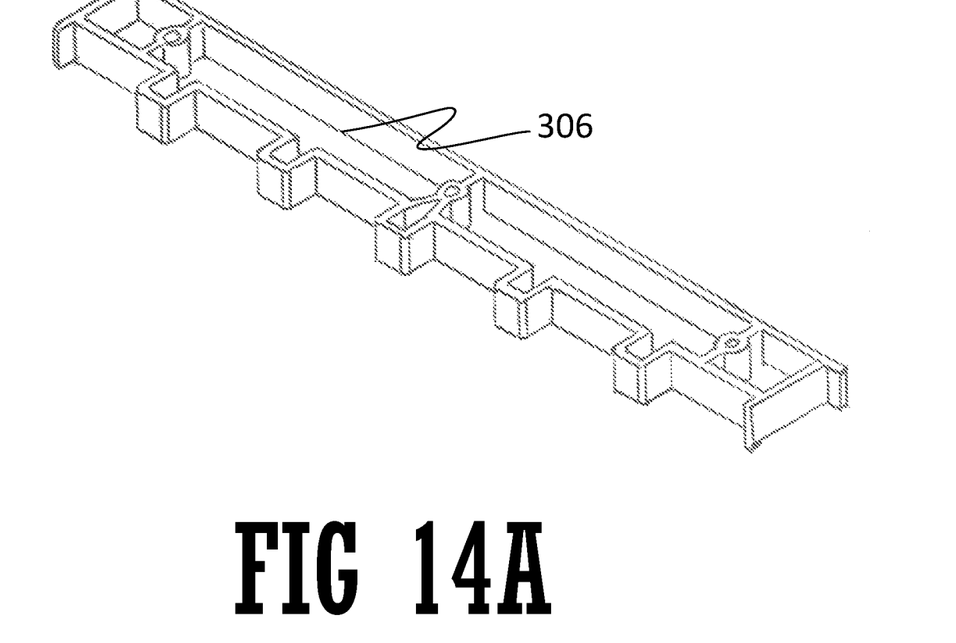
FIG. 14A is a top perspective view of an embodiment of the frame rest 306 used in the Honeybee Swarm Trap.
Figure 14B:
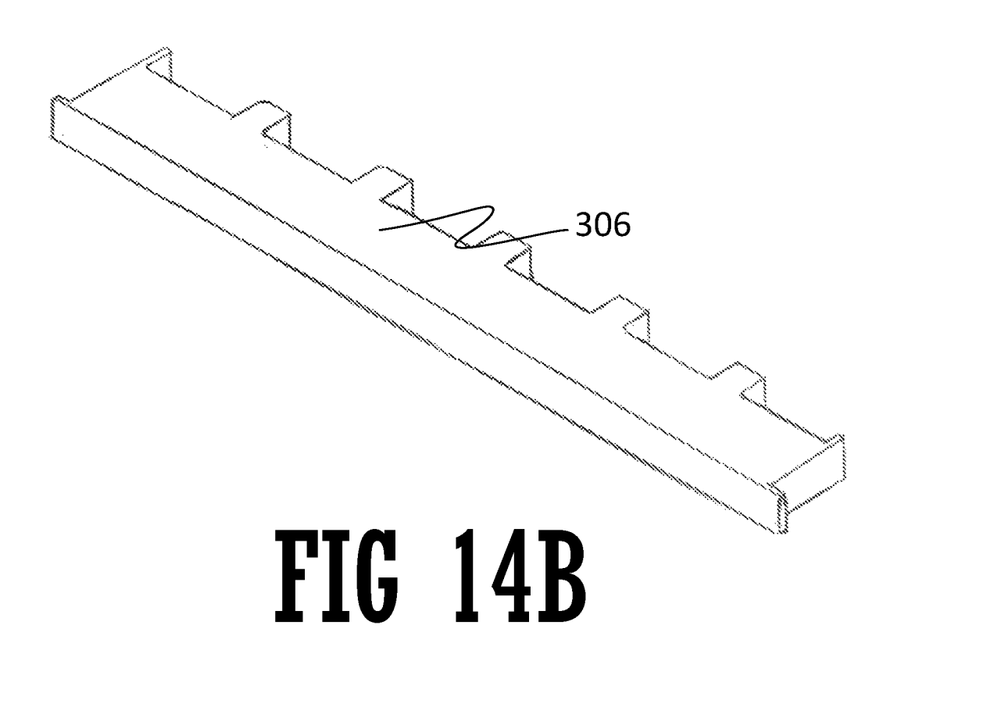
FIG. 14B is a bottom perspective view of an embodiment of the frame rest 306 used in the Honeybee Swarm Trap.

In an embodiment of the Honeybee Trap 100, the Honeybee Trap 100 comprises a lower hinged door 102 that opens downward and may be held open with a straight flat wire clip 1202. When a honeybee swarm has moved into the Honeybee Trap 100, the door can be folded up to close and locked in place with a straight flat wire clip pushed into the top area of the above the door.

Figure 6:
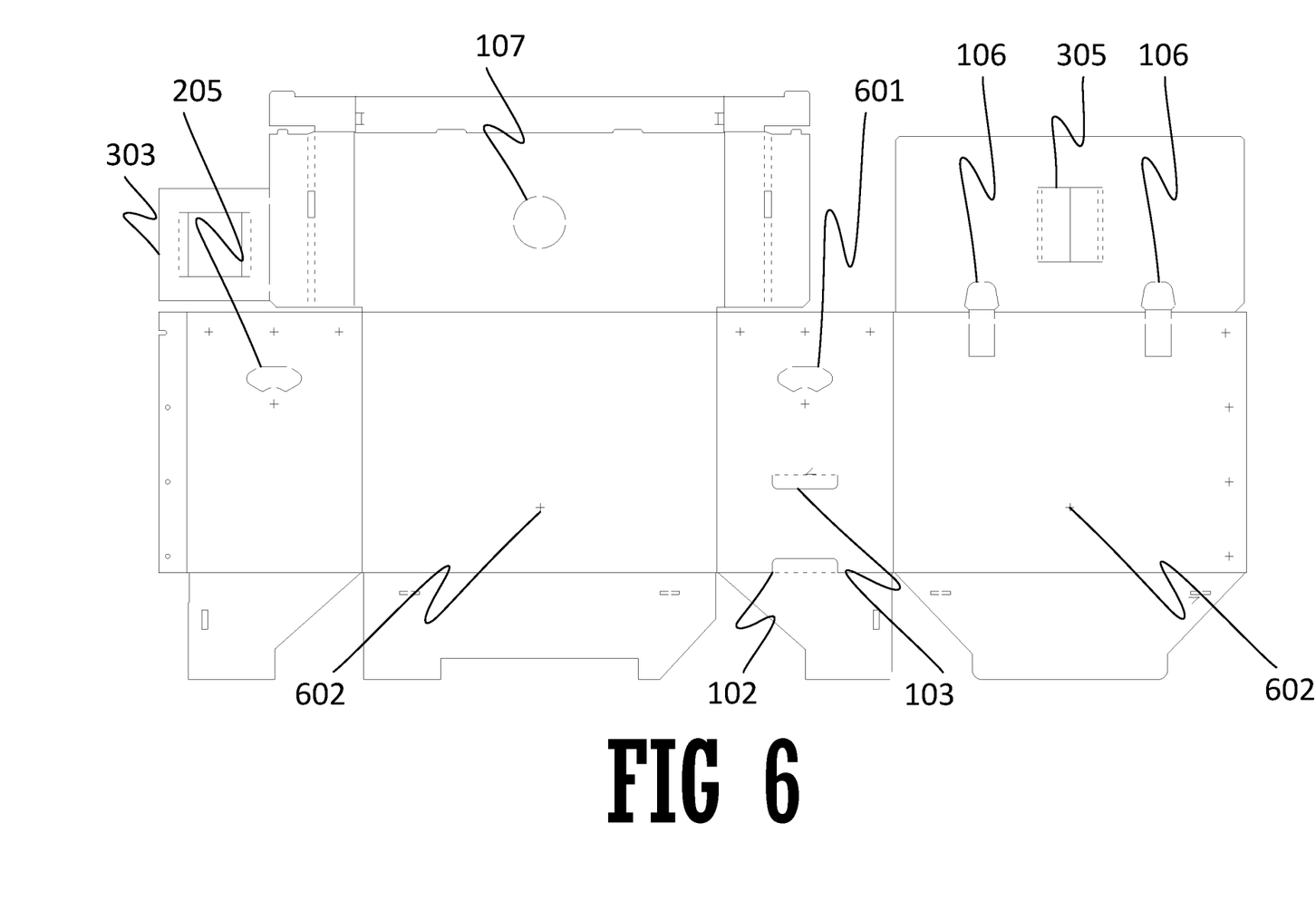
FIG. 6 is a top view of an embodiment of the Honeybee Swarm Trap showing the Honeybee Swarm Trap manufactured from a single piece of essentially flat material.
Figure 7A:
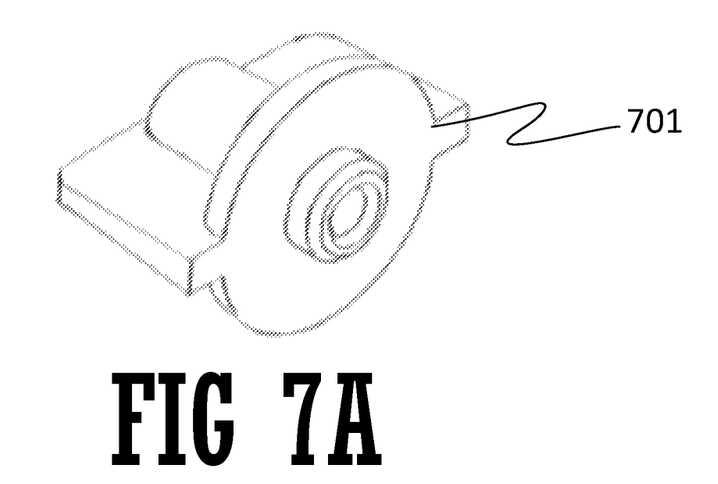
FIG. 7A is a perspective view of an embodiment of the screw receiver button used to assemble the Honeybee Swarm Trap.
Figure 7B:
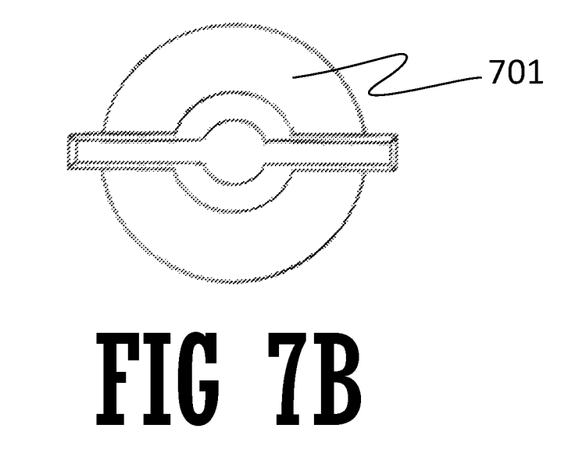
FIG. 7B is a top view of an embodiment of the screw receiver button used to secure the corner of the assembled Honeybee Swarm Trap.
Figure 7C:
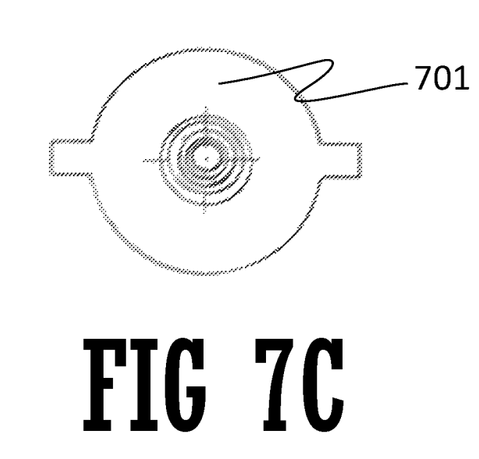
FIG. 7C is a bottom view of an embodiment of the screw receiver button used to secure the corner of the assembled the Honeybee Swarm Trap.
Figure 9:
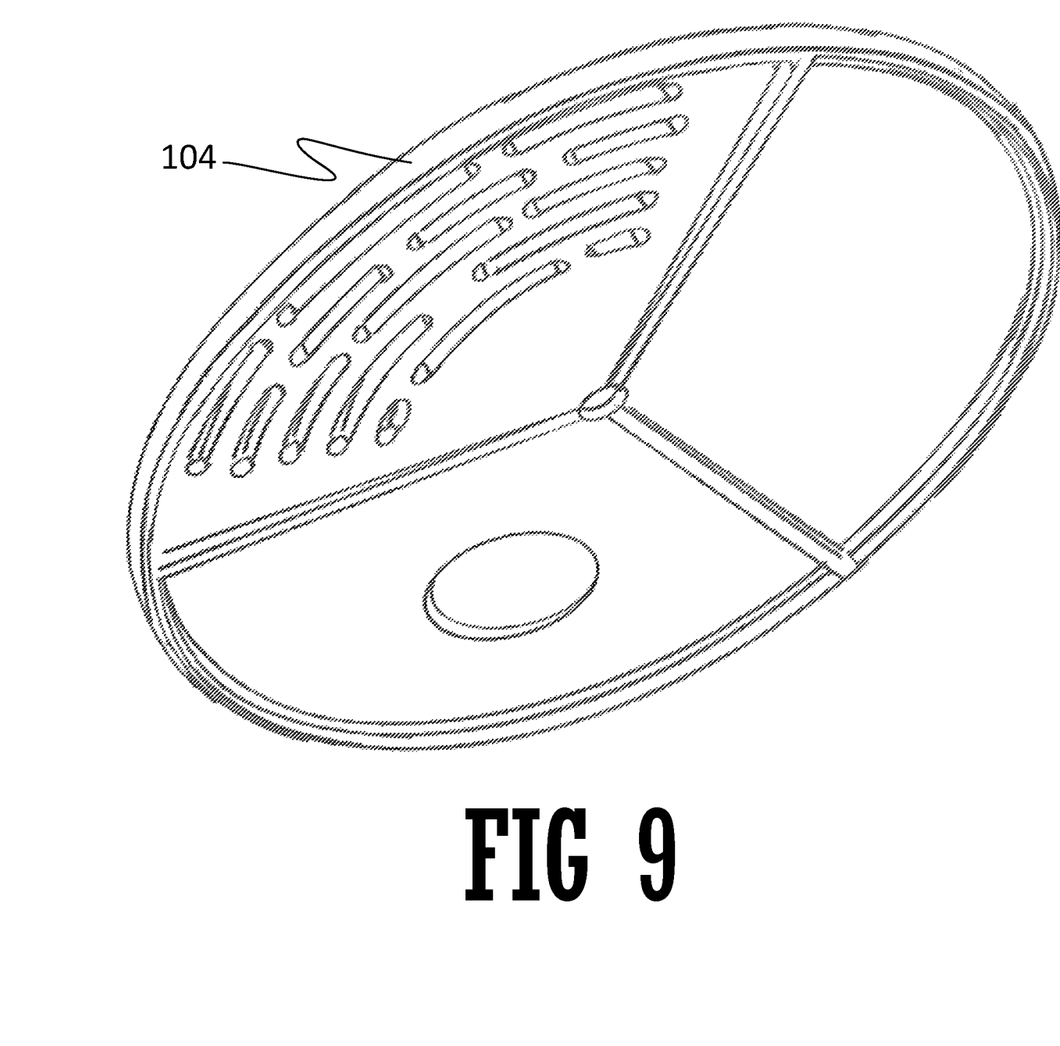
FIG. 9 is a perspective view of an embodiment of the concave vent disc used in the Honeybee Swarm Trap.
Figure 10:
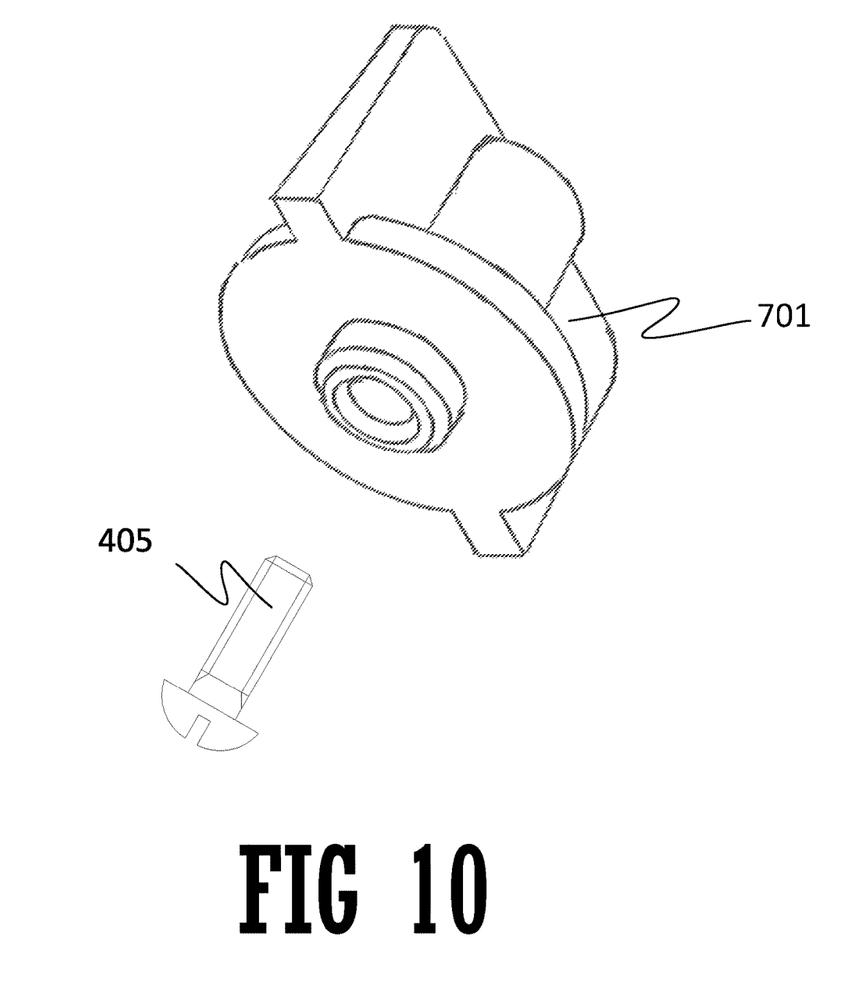
FIG. 10 is a perspective view of an embodiment of the screw 405 and screw receiver button 701 as disassembled.

In an embodiment of the Honeybee Trap 100, the Honeybee Trap 100 comprises an upper hinged door 103 that opens upward. The upper hinged door 103 may be held open with a flat wire clip that is inserted in corrugated and bent upward at a 90-degree angle. The vent disc 104 comprises slots sized so that honeybees cannot escape. There is a semi-punched kidney shaped front hole 205 and a semi-punched kidney shaped back hole 601 with a semi-punched or "X" mark at the center of the kidney radii. The semi-punched kidney shaped front hole 205 is located on the front of the trap and the semi-punched kidney shaped back hole 601 is located on the back of the trap. The semi-punched kidney shaped front hole 205 and a semi-punched kidney shaped back hole 601 may or not be punched out. The vent disc 104 is rotated to the closed position when setting the trap. The vent disc 104 is rotated to the vent position after a honeybee swarm has entered the trap. This will allow the honeybees to have fresh air while the trap and honeybees are transported.

In an embodiment of the Honeybee Trap 100, the one or more integral locking tabs comprises two integral locking tabs 106.

Figure 2A:
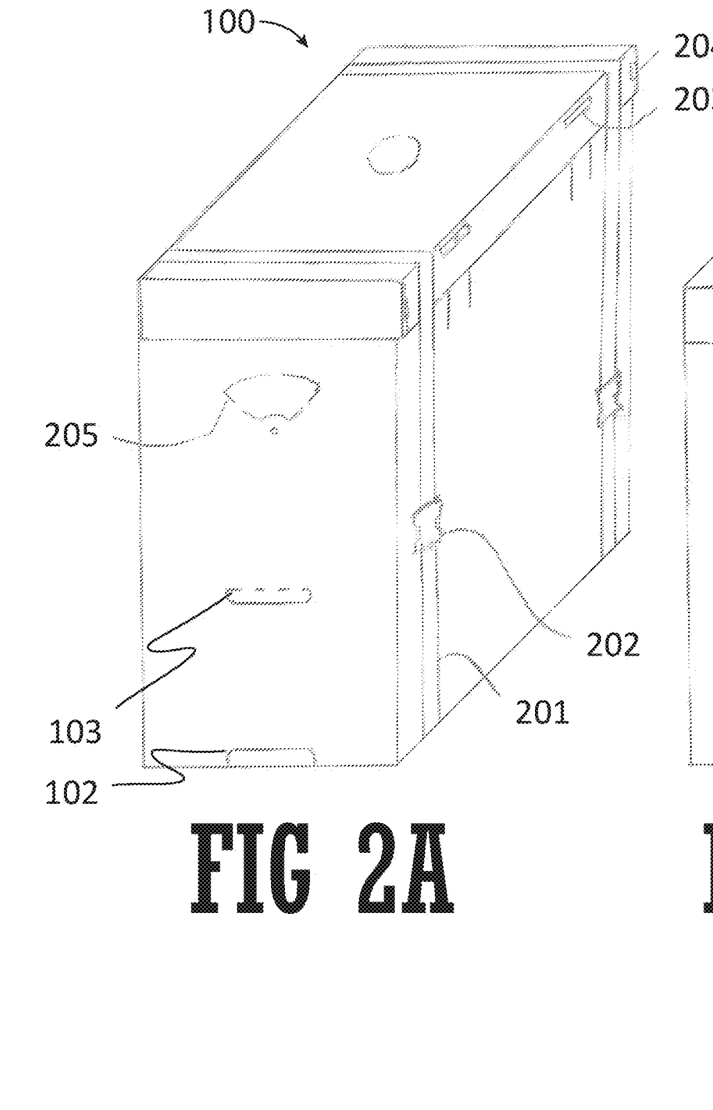
FIG. 2A is a perspective view of the front of an embodiment of the Honeybee Swarm Trap, with the top secured with fastening straps.
Figure 2B:
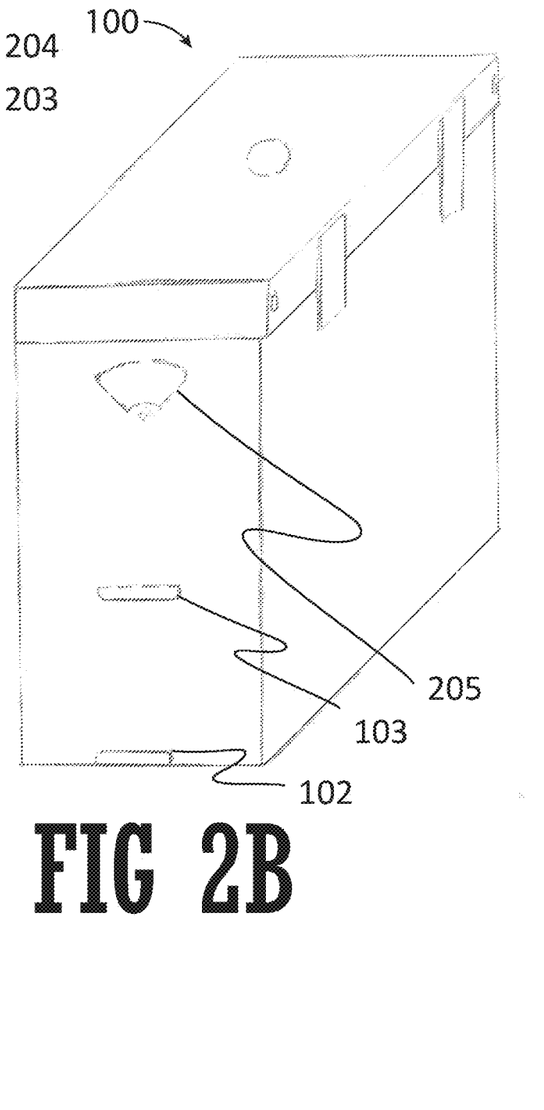
FIG. 2B is a perspective view of the front of an embodiment of the Honeybee Swarm Trap with the top secured with the two securing flaps.

In an embodiment of the Honeybee Trap 100 comprises optional straps 201 to further secure the outer lid with integral hinge 105 and an adjustable strap buckle 202; a slot for locking tab 203; a lid locking slot 204; and a semi-punched kidney shaped front hole 205, with semi punched screw hole, front and back.

Figure 3A:
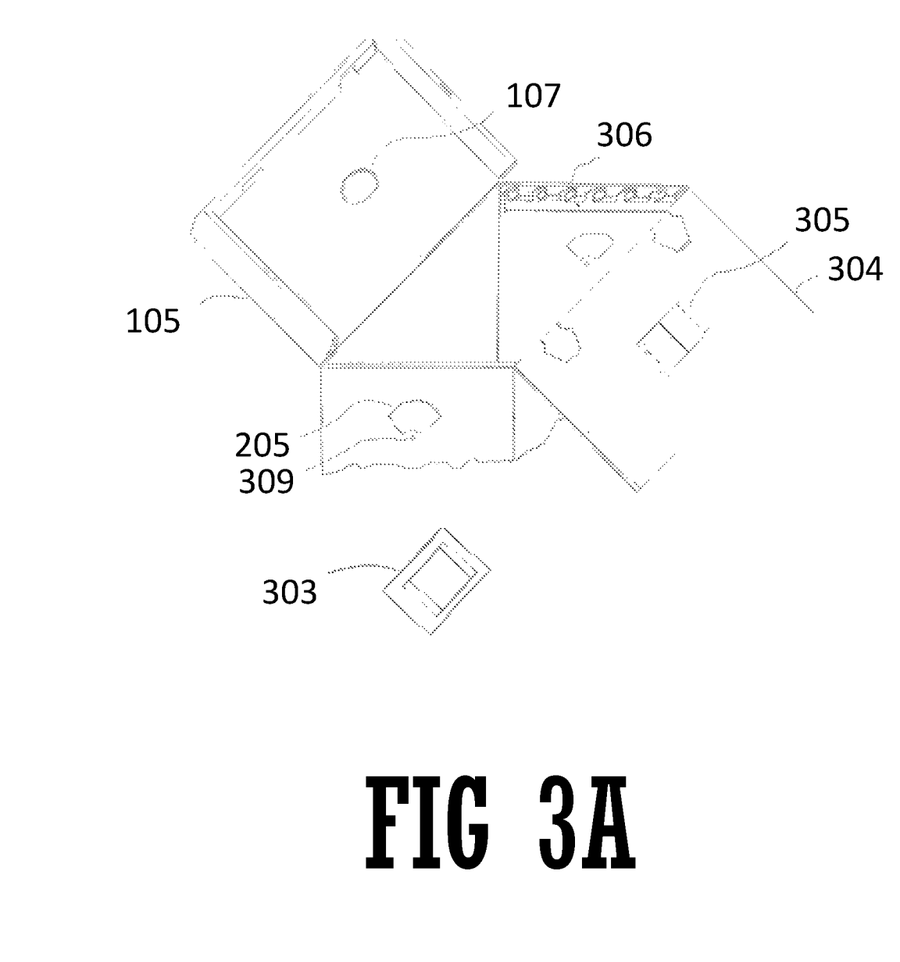
FIG. 3A is a perspective view of an embodiment of the Honeybee Swarm Trap in the open position.
Figure 3B:
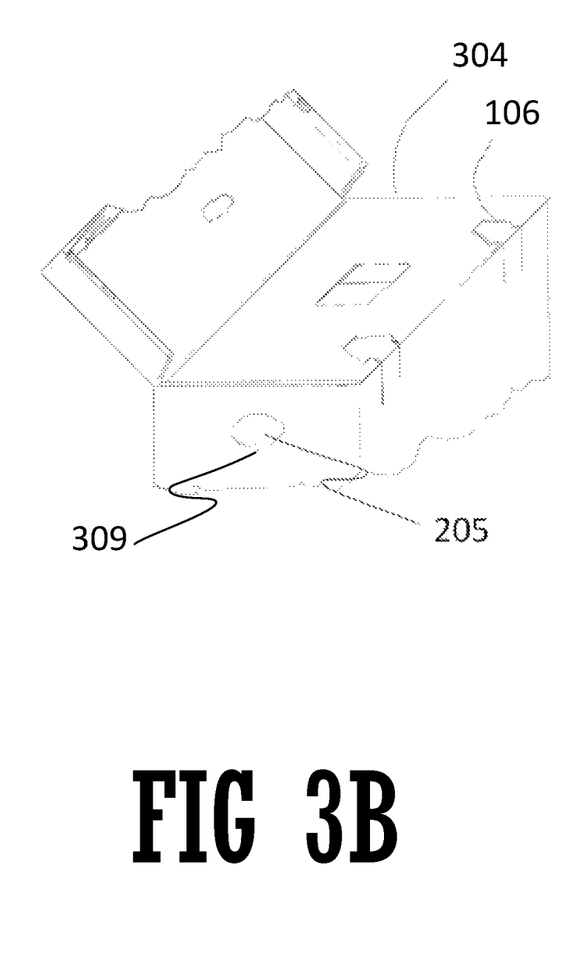
FIG. 3B is a perspective view of an embodiment of the Honeybee Swarm Trap with the inner lid closed.

In an embodiment of the Honeybee Trap 100 comprises one or more semi punched locking tabs 106; an inner lid with integral hinge (shown in closed position) 304; feeder jar spacer 303; inner lid 304 (shown in open position in FIG. 3A); pre-punched feeder jar opening with fold back spacer flaps 305; molded "screw in", two frame rests 306, one for each end of honeybee trap box 101; a pre-punched feeder hole 107 (shown with hole removed in FIG. 3A); outer lid 105 with integral folded collars 308; semi-punched kidney shaped front hole 205; and hole for securing screw 309. The frame rests 306 are fastened to the inside of the trap with screws 405 and buttons 701.

Figure 4:
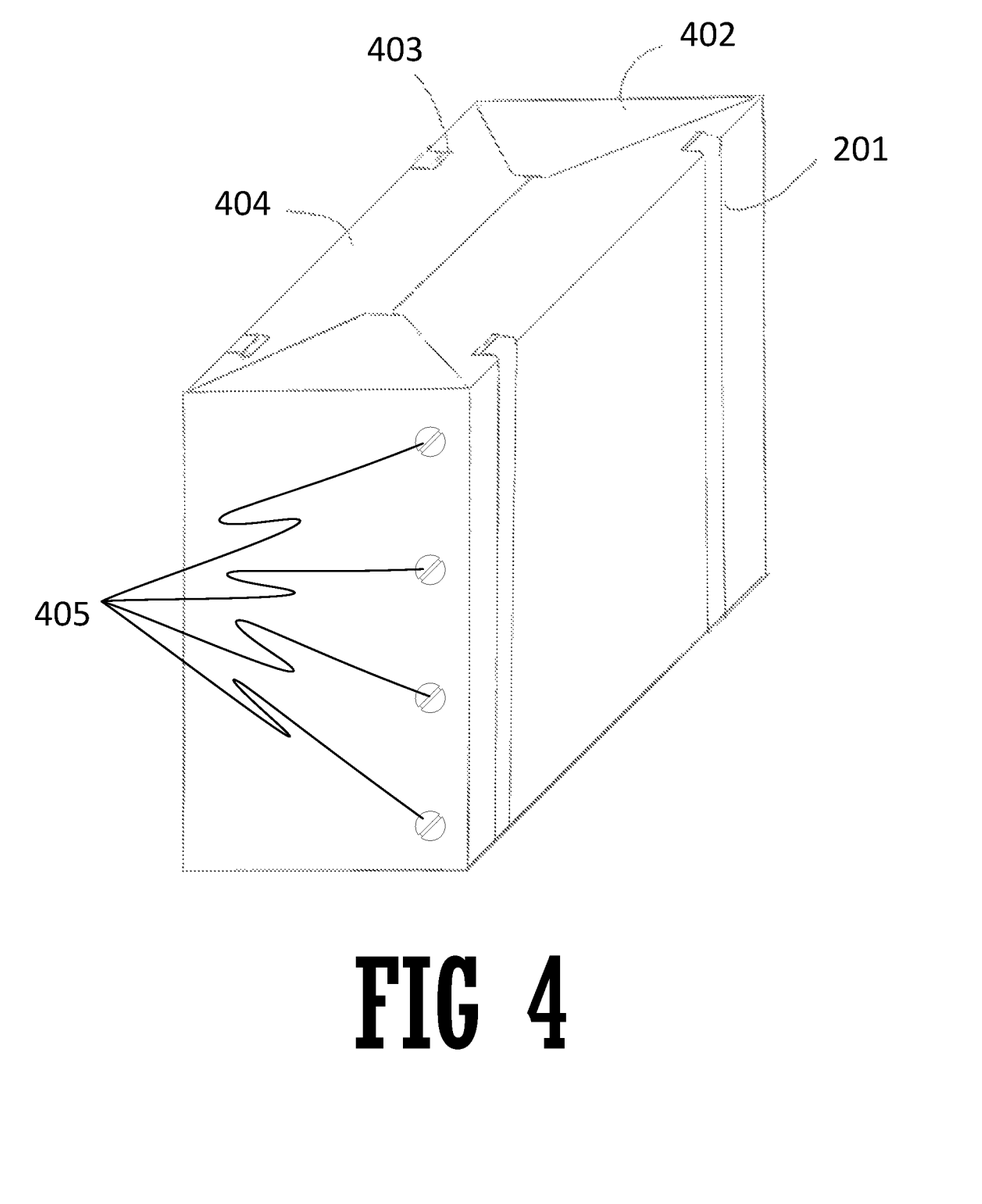
FIG. 4 is a perspective view of the bottom of an embodiment of the Honeybee Swarm Trap in the assembled position with straps threaded through slots in bottom and corner securing screws into buttons inside.

In an embodiment of the Honeybee Trap 100 comprises an optional securing strap 201 (shown in FIG. 4 threaded through bottom slots); end flaps 402, one on each end; four (4) slots for threading straps through bottom 403; and interlocking side bottom flaps 404.

Figure 8:
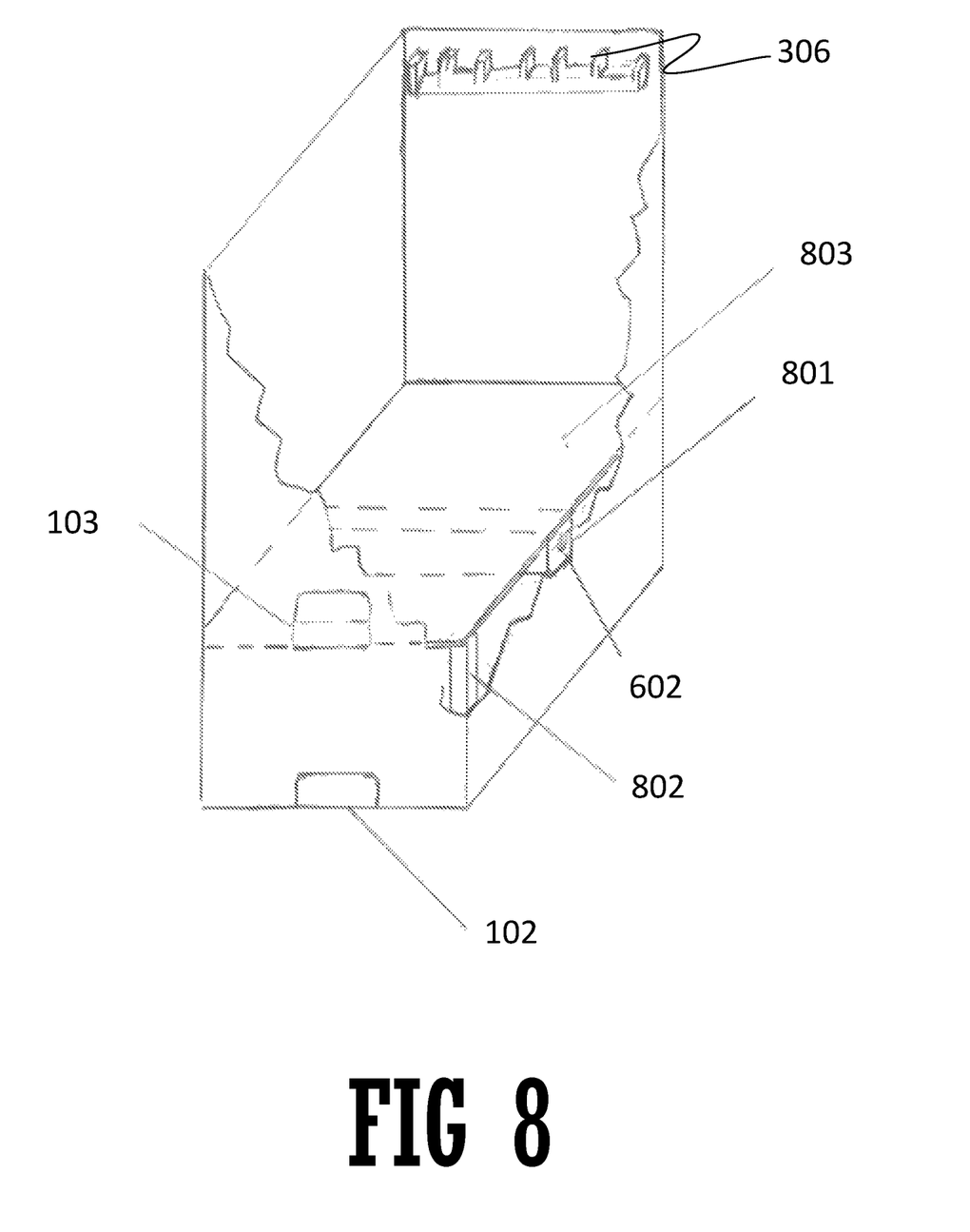
FIG. 8 is a sectional view of an embodiment of the frame rest used in the Honeybee Swarm Trap and showing the optional floor that reduces the depth of the trap to that of a full depth nucleus hive.

In an embodiment of the Honeybee Trap 100 comprises a bee trap that is approximately 40 liters in volume, and holds 6 standard Langstroth frames wide. This volume and width are the optimum size for bees to start a new home. However, this size is too deep for standard Langstroth frames. Therefore, a unique "floor" may be included that can be assembled after the bees are caught. This floor is used in conjunction with the upper entrance door. To use this embodiment the six frames are temporarily removed. The lower door is shut, and floor supports are added. A center support may be wood and is the length and width of the trap are equal. Center punched "X" may be provided in the outside walls of the trap to locate the screws in the center (front to back) that will hold the wood piece in the proper height to hold the floor in the correct position to simulate the depth of a full depth Langstroth hive. Additional supports are added in the front and back of the trap to hold the floor level. Then the bees on the frames that were removed are returned to the trap. All this may be done, if the goal is to let the bees develop a nucleus colony, that may be transferred to a regular size Langstroth hive box. In one embodiment the Honeybee Trap 100 comprises a wood support 801, four corner supports 802, a lower hinged door 102 that is closed, an upper hinged door 103 that is open, an optional floor 803 to make nucleus box depth, and a pre-punched "X" 602 with a screw to hold wood support.

In an embodiment of the Honeybee Trap 100 comprises one or more semi punched locking tabs 106, fold back spacer flaps 305, and a straight flat wire clip 1202. The one or more semi punched locking tabs 106 provide a means to secure the lid to the lid locking slot 204.

Figure 5:
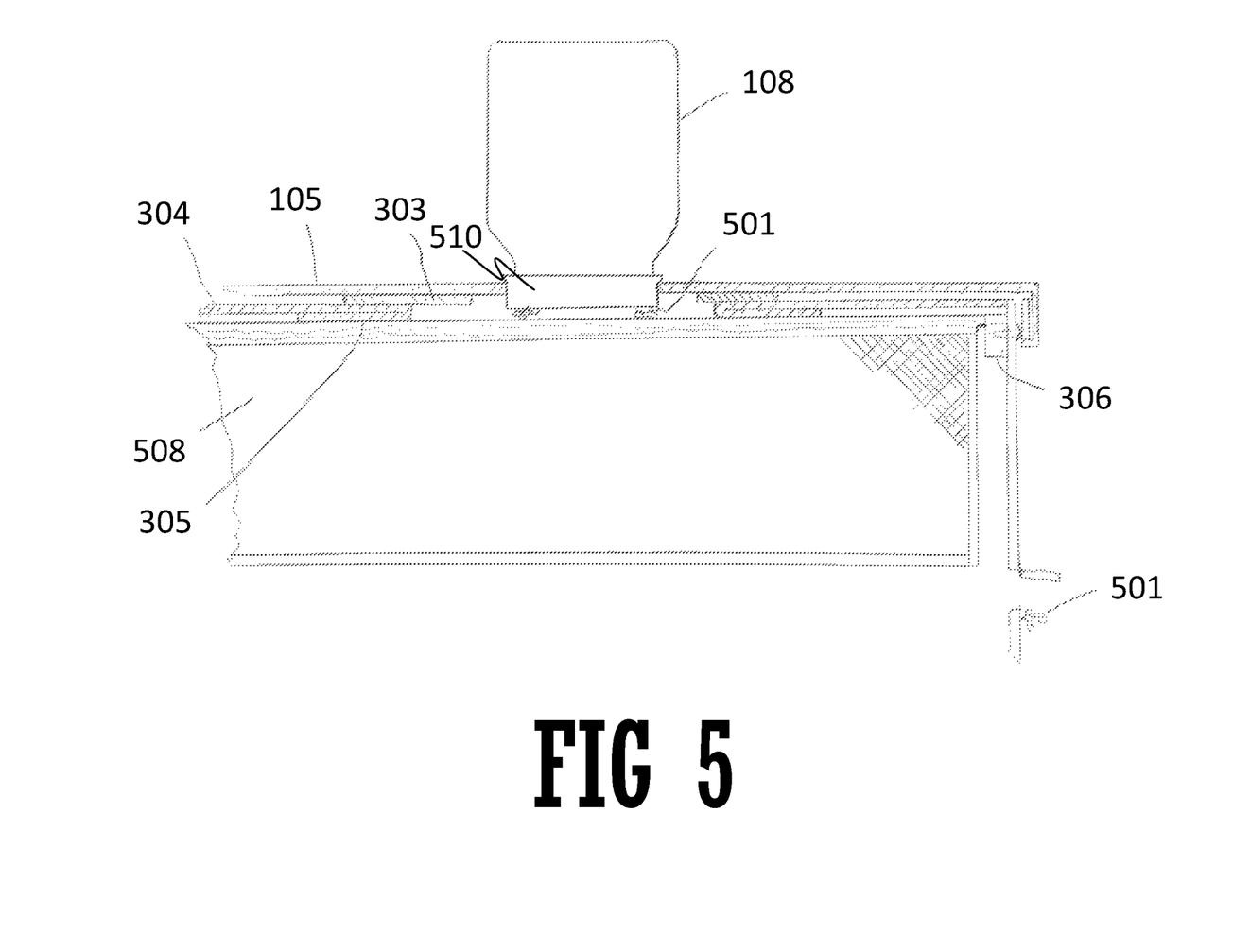
FIG. 5 is a sectional view of an embodiment of the Honeybee Swarm Trap with optional feeder jar fitted in top hole, and showing a bee attracted to the Swarm Catcher Bee Trap about to enter the trap, lower right corner.

The best mode of operation of the Honeybee Trap 100 is to place the Honeybee Trap 100 within 100 yards to 2 miles of an established beehive. The interior of the Honeybee Trap 100 will be more attractive to scout bees if the beekeeper adds beehive frame/s with a bee's wax foundation 508. Frames will be placed on frame rests 306, that provide proper bee space and to prevent frames from moving when transporting. One or more scout honeybees 501 will enter the box and explore the interior of the Honeybee Swarm Trap. In one embodiment of the interior volume of the Honeybee Trap 100 is between 40 L and 60 L. Scout bees can visit the swarm trap and assess the trap for a swarm or propagated swarm to take up residence. Once the honeybee swarm takes up residence in the swarm trap, the beekeeper can close entrance, and open vent. Then move the Honeybees in the Swarm Trap to another location to house the beehive. Inner cover spacer flap 305. And spacer will provide bee space under the feeder bottle so bees may access the optional feeder jar 108. A honeybee feeding aperture with an optional feeder jar 108 allows feeding the bees after a swarm is captured. A feeder jar spacer 303, outer lid 105; and inner lid 304; support the optional feeder jar 108.

In a best mode of operation if the semi-punched kidney shaped front hole 205 and a semi-punched kidney shaped back hole 601 are punched out, a vent disc 104 must be added. The vent disk 104 is concave. The vent disc 104 is fastened with a screw 405 and button 701 through the vent center hole and the hole, hole in the trap ends below the kidney shaped hole. The concave feature will ensure the vent disc 104 will seal to the trap body. The screw 405 and button 701 may be slightly tightened so the disc may be rotated to the vent, to prevent venting, or a full hole position.

The best mode of operation of the Honeybee Trap 100 is to place frames with drawn beeswax foundation in the center of the Honeybee Trap 100. If drawn foundation is not available, use a beeswax foundation or bees wax starter strips. Adapter bars are available to accommodate various other beehive top bars used. Without frames or bars, bees will build comb on the top of the box and it will break off when opening the trap making a mess. The number of frames used depends on how often the Honeybee Trap 100 can be checked. A single frame can be used if monitoring the Honeybee Trap 100 daily. If the Honeybee Trap 100 can be checked only once a week, then 3 or 4 frames are recommended because the bees will need more comb to work with without building comb on the top flaps. Always put the frames in the center area of the box. It is best to leave empty space in the box as scout bees will need to fly around in the box to verify that the size of the Honeybee Trap 100 is sufficient for a full colony. The use of swarm attractant or a few drops of lemon grass oil is recommended. Close the vent disc and open the door. When bees are seen entering the Honeybee Trap 100 with pollen it is very likely that a swarm as occupied the Honeybee Trap 100. Wait until just after dusk when all the field bees are back, then close the door and open the vent and relocate the swarm to its permanent location. If bees are hanging on the front of the Honeybee Trap 100, spray them with water from a spray bottle and the bees should go inside the Honeybee Trap 100.

Figure 11:
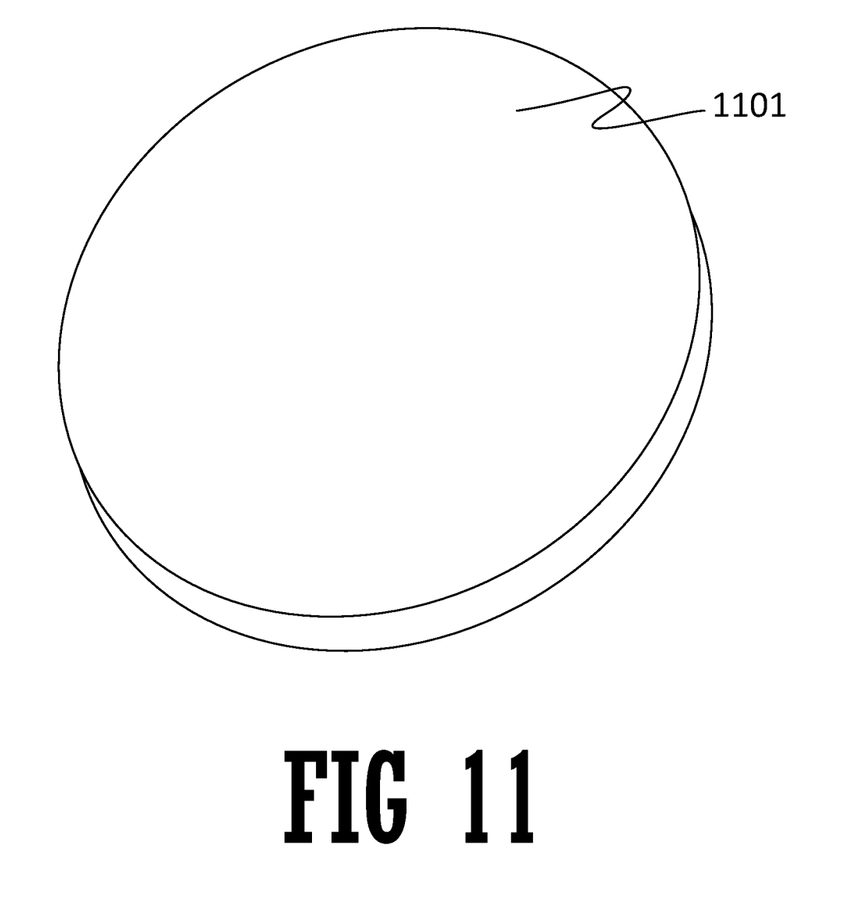
FIG. 11 is a perspective view of an embodiment of the feeder hole cap 1101.

When the swarm is at its permanent location for them put the Honeybee Trap 100 in that location and open the door and feed the bees immediately. Punch out the feeder jar hole in the top and add feeder jar with sugar syrup. If it is known that the bees will be fed at their permanent location, it is best to punch the hole out and putting the feeder hole cap 1101 in before setting the Honeybee Trap 100.

What is claimed is:

1. A honeybee swarm trap comprising:
   a honeybee trap box;
   a front hole positioned on a front surface of the honeybee trap box;
   a back hole positioned on a back surface of the honeybee trap box, wherein the front hole and the back hole are removable semi-punched kidney shaped holes;
   a lower hinged door configured to be positioned in one of a lower door open position or a lower door closed position;
   an upper hinged door configured to be positioned in one of an upper door open position or an upper door closed position;
   a rotatable, concave vent disc configured to mate and seal against an outer surface of a body of the honeybee trap box;
      wherein approximately one-third of a surface of the rotatable, concave vent disc comprises multiple vent apertures, another approximately one-third of the surface of the rotatable, concave vent disc comprises a single aperture, and the remaining approximately one-third of the surface of the rotatable, concave vent disc comprises no apertures;
      wherein the rotatable, concave vent disc can be rotated relative to the front hole to form an open position, a partially open position, and a closed position;
   an outer lid with an integral hinge, wherein the outer lid comprises a first removable pre-punched feeder jar opening configured for a feeder jar;
   an inner lid comprising an additional removable pre-punched feeder jar opening, wherein the additional removable pre-punched feeder jar opening includes one or more fold back spacer flaps, wherein the one or more fold back spacer flaps rotate about an axis to form one of a feeder open position or a feeder closed position;
   one or more integral locking tabs;
   a plurality of semi-punched slots for threading securing straps through a bottom of the honeybee trap box;
   a plurality of corner supports disposed at inside corners inside the honeybee trap box;
   a center support disposed horizontally inside the honeybee trap box; and
   a removable floor located inside the honeybee trap box, wherein the removable floor is solid, wherein the plurality of corner supports support a plurality of corners of the removable floor and the center support supports a center portion of the removable floor;
   wherein the removable floor is positioned between the lower hinged door and the upper hinged door at a height above a bottom surface of the honeybee trap box, wherein the lower hinged door is in the lower door closed position and the upper hinged door is in the upper door open position to prevent bees from entering the lower hinged door.

2. The honeybee swarm trap described in claim 1 comprising:
   the honeybee trap box that is manufactured from corrugated or polymeric material or other weather resistant material that when assembled is held in place with screws and retaining buttons on a folded corner with flat spring clips, screws, and buttons or sonic welds.

3. The honeybee swarm trap described in claim 2 comprising:
   the one or more integral locking tabs comprising two integral locking tabs;
   straps to further secure the outer lid with the integral hinge;
   an adjustable strap buckle;
   a slot for one of the one or more integral locking tabs;
   a lid locking slot; and
   the front hole comprised of a semi punched screw hole.

4. The honeybee swarm trap described in claim 3 comprising:
   one or more semi punched locking tabs;
   the inner lid with an integral hinge; and
   a feeder jar spacer.

5. The honeybee swarm trap described in claim 4 comprising:
   two frame rests, one for each end of the honeybee trap box;
   the outer lid comprised of integral folded collars; and
   a hole for securing screw.

6. The honeybee swarm trap described in claim 1 comprising:
   the one or more integral locking tabs comprising two integral locking tabs;
   straps to further secure the outer lid with the integral hinge;
   an adjustable strap buckle;
   a slot for one of the one or more integral locking tabs;
   a lid locking slot; and
   the front hole comprised of a semi punched screw hole.

7. The honeybee swarm trap described in claim 1 comprising:
   one or more semi punched locking tabs;
   the inner lid with an integral hinge; and
   a feeder jar spacer.

8. The honeybee swarm trap described in claim 1 comprising:
   two frame rests, one for each end of the honeybee trap box;
   the outer lid comprised of integral folded collars; and
   a hole for securing screw.

* * * * *